United States Patent [19]
Land et al.

[11] Patent Number: 5,225,930
[45] Date of Patent: Jul. 6, 1993

[54] COMB OPTICAL INTERFERENCE FILTER

[75] Inventors: Peter L. Land; Roger J. Becker, both of Dayton, Ohio

[73] Assignee: The United States of America as represented by the Secretary of the Air Force, Washington, D.C.

[21] Appl. No.: 924,684

[22] Filed: Sep. 30, 1992

Related U.S. Application Data

[60] Division of Ser. No. 746,294, Aug. 13, 1991, Pat. No. 5,170,290, which is a continuation-in-part of Ser. No. 522,704, May 10, 1990, abandoned.

[51] Int. Cl.$^5$ .......................... G02B 5/28; G02F 1/01; G01B 9/02
[52] U.S. Cl. .................................... 359/578; 356/352; 359/579; 359/580
[58] Field of Search ........................ 359/578, 579, 580; 356/352

[56] References Cited

U.S. PATENT DOCUMENTS

| | | | |
|---|---|---|---|
| 3,579,130 | 5/1971 | Smiley | 350/166 |
| 3,726,585 | 4/1973 | Fedotowsky et al. | 350/160 |
| 3,737,210 | 6/1973 | Howe | 350/166 |
| 3,753,822 | 8/1973 | Heinrich | 156/101 |
| 3,771,857 | 11/1973 | Thomasson et al. | 350/166 |
| 4,068,260 | 1/1978 | Ohneda et al. | 350/166 |
| 4,227,769 | 10/1980 | Phillips et al. | 350/162 |
| 4,240,696 | 12/1980 | Tracy et al. | 359/578 |
| 4,547,801 | 10/1985 | Haisma et al. | 350/166 |
| 4,666,250 | 5/1987 | Southwell | 350/166 |
| 4,756,602 | 7/1988 | Southwell et al. | 350/166 |
| 4,790,634 | 12/1988 | Miller et al. | 356/352 |
| 4,826,286 | 5/1989 | Thornton, Jr. | 350/166 |
| 4,842,633 | 6/1989 | Kuribayashi et al. | 350/162 |
| 4,915,463 | 4/1990 | Barbee, Jr. | 350/162 |
| 4,952,025 | 8/1990 | Gunning, III | 350/166 |

FOREIGN PATENT DOCUMENTS 3538996 5/1987 Fed. Rep. of Germany .
59-97104 6/1984 Japan .

OTHER PUBLICATIONS

Maeda et al, "Electronically Tunable Liquid-Crystal-Etalon Filter for High Density WDM Systems," *IEEE Photonics Tech Lett*, 2:11 820 (1990).
Lytel et al, "Narrowband Electrooptic Tunable Notch Filter," *App Opt*, 25:21, p. 3889 (1986).
Becker, "Design and Analysis of Optical Comb Filters," Tech Rep WRDC-TR-90-4012, Ad Number B1427949 (1990).
Sansone et al, "Large Kerr Effects in Transparent Encapsulated Liquid Crystals," *J Appl Phys*, 67:9, p. 4253 (1990).
Title et al, "Tunable Birefringent Filters," *Opt Eng*, 20:6, 815 (1981).
(List continued on next page.)

*Primary Examiner*—Martin Lerner
*Attorney, Agent, or Firm*—Bobby Scearce; Donald J. Singer

[57] ABSTRACT

High total transmission, tunable comb filter structures are described which comprise moderately thick layers of optical material having periodic or multiply periodic refractive index modulation features comprising a multiplicity of coherently-coupled, weakly-resonant optical cavities, resulting in and characterized by spectra of high order (5 or higher) relative to a fundamental (lowest order) cavity resonance, consisting of narrow, moderate to high density reflection lines occurring in one or more sets, each set being characterized by lines equally spaced by wave number if optical dispersion is neglected. Filters of the inversion can be structured to be tuned, electro-optically or mechanically such that the peaks within a spectral band of interest shift by one harmonic order and/or from one peak position to the next, to reflect or transmit light of any specific wavelength within a band. The individual features defining optical cavities may be thin compared to a wavelength of interest as, for example, when metal films are used as part of a singly periodic comb filter, or may consist of a section whose thickness is equal to several wavelengths, but which is short compared to a cavity length.

10 Claims, 6 Drawing Sheets

OTHER PUBLICATIONS

Gunning et al, "Multiple-Cavity Infrared Electro-Optic Tunable Filter," *Proc SPIE*, vol. 202, Active Optical Devices, p. 21 (1979).

van de Stadt et al, "Multi-Mirror Fabry-Perot Interferometers," *Opt Soc Am*, 2:8, 1363 (1985).

Jain et al, "Dual Tunable Fabry-Perot Spectrally Agile Filter," *Opt Eng*, 23:2, (1984), p. 159.

Gunning, "Electro-Optically Tuned Spectral Filters: A Review," *Opt Eng*, 20:6, 837 (1981).

Kimura et al, "Tunable Multilayer-Film Distributed Bragg Reflector Filter," *J Appl Phys*, 50:3, 1222 (1979).

Yariv et al, *Optical Waves in Crystals*, John Wiley and Sons, NY (1984), pp. 194 to 235, 254 to 264.

Henderson et al, "Programmable Electro-Optic Tunable Filters," *Proc SPIE*, vol. 202, Active Optical Devices, p. 16 (1979).

Atherton et al, "Tunable Fabry-Perot Filters," *Opt. Eng.*, 20N:6, 806 (1981).

Jenkins et al, *Fundamentals of Optics*, 4th Edition, McGraw Hill Inc., NY (1976), pp. 301-308.

Born et al, *Principles of Optics*, 3rd Revised Edition, Pergamon Press, N.Y., N.Y. (1965), pp. 323 to 333.

Dobrowlski, "Coatings and Filters," in *Handbook of Optics*, Driscoll, Ed. Chap. 8, Optical Society of America, McGraw Hill, NY (1978).

Yeh et al, "Electro-Optic Tunable Filter Structures," *Proc. SPIE*, vol. 202, Active Optical Devices, p. 1 (1979).

Chang, "Electronically Tunable Optical Spectral Filters," *Opt Eng*, 20:6, 805 (1981).

COMB OPTICAL INTERFERENCE FILTER

RIGHTS OF THE GOVERNMENT

The invention described herein may be manufactured and used by or for the Government of the United States for all governmental purposes without the payment of any royalty.

CROSS REFERENCE TO RELATED APPLICATION

This application is a division of copending application Ser. No. 07/746,294 filed Aug. 13, 1991 now U.S. Pat. No. 5,170,290, which is a continuation-in-part of Ser. No. 07/522,704, filed May 10, 1990, now abandoned.

BACKGROUND OF THE INVENTION

The present invention relates generally to optical comb filters, and more particularly to high total transmission, tunable comb filter structures comprising moderately thick layers of optical material having periodic or multiply periodic refractive index modulation features resulting in a multiplicity of coupled, weakly-resonant optical cavities, characterized by spectra of high order relative to a fundamental resonance, consisting of narrow, moderate to high density reflection lines occurring in one or more sets, each set being characterized by lines equally spaced by wave number. Filters can be designed to be tuned, electrically or mechanically, such that the line peaks within a spectral band of interest shift by one harmonic order and/or from one peak position to the next. Thus a filter may be tuned to reflect or transmit light of any specific wavelength within a band. The individual features defining optical cavities may be thin compared to a wavelength of interest as, for example, when metal films are used as part of a singly periodic comb filter, or may consist of a section whose thickness is equal to several wavelengths.

For the purposes of describing the invention and defining the scope thereof, the term "optical" shall, in accordance with customary usage, be defined herein to include only vacuum ultraviolet, ultraviolet, visible, near infrared, mid-infrared and far infrared regions of the electromagnetic spectrum lying between about 0.01 and 1000 microns.

An optical comb filter may be defined as a filter whose spectra consists of a series of narrow reflection or transmission lines. In structures embodied by the present invention, the reflection spectra lines of a set are narrower then the spacing between neighboring lines; the spacing between line peaks of a set, in wave number units, is determined by the optical length of recurring optical cavities of equal optical length; cavities of equal length may be adjoining or separated and/or may physically overlap cavities of the same or of a different length.

The comb filter structures according to the present invention may yield sets of comb reflection lines whose peak amplitudes are uniform or modulated by one or more identifiable envelope functions relating to the detailed refractive index modulation of the material within the boundaries of the recurring optical cavities. The filters can be structured to produce envelope functions in accordance with application requirements.

There are numerous examples of prior art that are included under the above definition of a comb or tunable comb filter which are distinct from the present invention in design specifications and spectral characteristics. The best known example is a simple Fabry-Perot (F-P) filter, which consists of a single optical cavity with highly reflecting boundary features which may be metal films or index modulated dielectric films. The F-P filter transmits narrow special lines and reflects most light incident from a spectrally broad collimated source (see Atherton et al, "Tunable Fabry-Perot Filters", Opt Eng 20N;6, 806 (1981); Jenkins et al "Fundamentals of Optrics, 4th Edition, McGraw Hill, Inc. N.Y., N.Y. (1976); Born et al, "Principles of Optics", 3rd Revised Edition, Pergamon Press, N.Y., N.Y. (1965)). Interference filters based on thin film stacks and multiple F-P cavities have been described (Dobrowolski in Chapter 8 of the Optical Society of America, "Handbook of Optics) Mulitple F-P cavity films where the reflectors are moderate to highly reflecting metal films are discussed in Dobrowolski, but these are different in structure and function from the filters under consideration here. In those cases, cavities are F-P type and the spectra of interest are narrow transmission lines. This invention pertains to multiple cavity filters in which cavity resonances are relatively weak and which filters provide high order reflection comb lines and moderate to high total transmission of a broad spectral band.

When a broad band of collimated light is incident on a F-P cavity having low absorption, those frequencies which resonant within the cavity, the comb spectra, will be transmitted as narrow lines, while the majority of the light is reflected. Thus the total transmission of a F-P type comb filter is relatively low and the total reflectivity is relatively high, so long as the band of incident light is broad compared to the F-P filter spectral lines.

If an optical system requires high throughput of a broad band of optical frequencies, then a F-P type comb filter may be included only if used in reflection; Also, if high transmission of a narrow line source is of interest then the F-P filter may be suitable for providing high total transmission of such a source. If low total throughput is allowed for a band of frequencies then the F-P can be used to block light from most of a band while passing one or more narrow lines within the band (that, if F-P type filters can be used as moderate to low density reflection filters for bands of light between narrow ranges of transmission); however, if a high degree of rejection is required, as may be the case when using a tunable filter to reject a laser line, then the F-P is not a suitable tunable filter except when used in reflection.

The tunable comb filters which are the subject of this invention are distinctive is design and construction from the F-P type and capable of providing a function that is the opposite of that of the simple F-P type and those which are closely related. The filters consist of single or multiply periodic index modulation features forming cavities each of which is terminated by features presenting low to moderate reflectance of a more or less broad range of frequencies. Such a filter may highly reflect one or more sets of narrow lines, each line set being equally spaced in frequency or wave number (neglecting dispersion, i.e. $n_a$=constant), while transmitting most of a relatively broad band of incident light. Such a filter can be used as a transmitting element in systems requiring high total throughput of a broad band of collimated light while providing a high degree of rejection of any specific in-band spectral line by tuning.

Another filter type conforming to the above definition of a comb filter, which is also distinct from the present design criteria, is a multiline, stack, rugate or Bragg type filter. These are not based on moderate to high harmonics of optical cavities in that the only significant reflections for a particular modulation are the first order (FIG. 4a, infra) and occasionally the second order. These filters are most typically constructed by stepwise or continuous modulation of the refractive index of a film in accordance with a profile resulting from superposing a number of individual periodic stepwise or sinusoidal modulations, each of which contributes to a specific spectral reflection line (see Gunning, U.S. Pat. No. 4,952,025). An alternative approach is to construct the multiline filter by laying down a single series of periodically modulated layers each having a different modulation period, such that each layer generate a specific reflection line (FIG. 4a, infra). These two types may be classified as parallel and series constructions, respectively. In at least one case it has been recognized that it may be advantageous to construct what might be called a parallel-series filter consisting of a superposition of two or more short periods with a long period of modulation extending through the entire structure wherein different parts of the total thickness contain different shorter periods of modulation, these parts occurring in series, as in Gunning. The presumed advantage is that the reflection lines will have a more nearly common optical density, since the optical density of each line of a filter is proportional to the number of periods of the corresponding part of the index modulation. The widths of the spectral lines for filters of this type are inherently broader than those of the cavity filters (see FIGS. 1, 4b and 5, infra) according to the invention, so that high total transmission of a broad band source cannot be maintained when lines are spaced close enough for practical electro-optical tuning from line to line.

A review of literature on tunable filters has not revealed any filters which are alike in design and function to those described herein. Yeh et al, "Electro-optic tunable filter structures," in Proceedings SPIE Vol 202 Active Optical Devices, p-1 (1979), Chang, "Electronically tunable optical spectral filters", Optical Engineering, Vol. 20, No. 6, p 805 (1981), and Gunning, "Electro-Optically tuned spectral filters: a review," Optical Eng. Vol. 20, No. 6, p. 837 (1981) review a number of types of tunable or cavity filters. Most are not designed to produce comb spectra, and when they are it is a line spectra in transmission separated by relatively broad regions of reflection. Some of the tunable filters deal with producing and or tuning one spectral line; for example, by deforming a thin film stack under high pressure to tune the fundamental (lowest order) reflection line (Kimura, et al. "Tunable multilayer-film distributed-Bragg-reflector filter", J. Appl. Phys., Vol. 50, No. 3, p-1222 (1979)), or inducing index modulation acoustically, (Chang, "Acousto-optic tunable filters, Optical Engineering", 20, No. 6, p-824 (1981);) Yariv et al, "Optical Waves in Crystals", John Wiley & Sons, N.Y., N.Y. (1984); or by rotating polarization between plane polarizers as with the electrical tuning of a stack of birefringent material (Henderson et al, "Programmable electro-optic tunable filters", SPIE Vol 202, Active Optical Devices, p. 16 (1979); Title et al, "Tunable birefringent networks", Ibid, p-47)). The filters that involve optical cavities exclusively deal with F-P type where cavities are bounded by moderate to highly reflecting structures which may be a metal film or a transparent dielectric film having a periodic refractive index modulation (Gunning et al, "Multiple-cavity infrared electro-optic tunable filter", Ibid p-21; van de Stade et al, "Multimirror Fabry-Perot Interferometers, Opt. Soc. Am." Vol. 2, No. 8, p 1363 (1985); Jain et al, "Dual tunable Fabry-Perot spectrally agile filter", Optical Engineering, Vol. 23, No. 2, p 159 (1984); and Maeda et al, "Electronically Tunable Liquid-Crystal-Etalon Filter for High-Density WDM Systems, IEEE Photonics Tech. Lett. 2, No. 11, p-820 (1990)). Some of the filters provide lines that are narrow in transmission which occur within a relatively broad reflection band associated with the optical period of the cavity boundary index modulation (Lytel et al, "Narrowband electrooptic tunable notch filter", Applied Optics, Vol. 25, No. 21, p-3889 (1986)). Some of the multiple cavity F-P type structures are concerned with the suppression of comb lines and/or increasing the free spectral range between transmission lines associated with a single F-P cavity, (Gunning et al, van de Stat et al, and Jain et al) while others are concerned with providing interference among cavities of slightly different length to broaden a transmission line while providing a sharp cutoff in transmission. (Dobrowolski, and van de Stadt). Others are concerned with controlling the strength of interference fields within a multiple cavity F-P structure in order to increase the transmission of a single narrow line by reducing absorption by defects at modulation steps. (Southwell et al, U.S. Pat. No. 4,956,682). Still others are concerned with employing nonlinear optical material in an F-P optical cavity to produce optical bistability. (Miller et al, U.S. Pat. No. 4,790,634). The construction of singly and multiply periodic cavity filters having narrow, moderate to high optical density reflection lines that provide moderate to high total transmission of a broad band and provide for rapid tuning of reflection lines over a free spectral range according to the invention is lacking in the prior art.

In accordance with a principal feature of the invention, so individual feature of a filter of the invention reflects more than 70% at any optical wavelength in a band of interest. The peak reflectance $R(u,v)$ and the peak reflectance $R$ and optical density $D$ for the comb filters, respectively, corresponding to each individual element $f(u,v)$ and group of like elements can be derived from the following set of relations, where absorption is assumed to be zero (Becker, "Design and Analysis of Optical Comb Filters", Tech. Rpt. WRDC-TR-90-4012., AD Number B142749 (1990) at pp 35, 40 and 59, and Yariv et al at page 197:

$$R(v) = 1 - T(v) = \tan h^2 \Psi(v)$$

$$D(v) = -\log_{10}(T(v))$$

$$D(v) = 2 \log_{10} \cos h\Psi(v)$$

$$\Psi(v) = U\Psi(u,v) = bm(u,v)\Delta\epsilon/\epsilon_a$$

$$D(v) = 0.868\Psi(V) - 0.6, \Psi(v) >> 1$$

$$D(v) = 0.434\Psi^2(v), \Psi(v) << 1$$

where b is a constant or order unity and equal to $\pi/4$ for sinusoidal modulation, T is the percent transmission, and D is the optical density, the other terms being defined below.

It is therefore a principal object of the invention to provide an improved tunable comb type interference filter.

It is a further object of the invention to provide a tunable comb filter such that reflection lines may be spaced at intervals that permit electro-optic tuning by at least one harmonic order, in order to reflect (prevent the transmission of) light of any specific frequency within a band of interest.

It is another object of the invention to provide a tunable comb filter providing multiple reflection lines such that each neighboring line pair associated with an optical cavity of length $L_R$ are separated by a spectral difference substantially larger (2 times or more) than the line half-widths in order that the total transmission of a broad light band may be moderate to high.

It is another object of the invention to provide a comb filter where the peak amplitude of individual or groups of reflection lines is weighted by control of the refractive index profile in addition to the refractive index excursion. In general such a filter may be described by a series of adjacent features each having a distinctive index modulation which is repeated at selected intervals, resulting in a series of optical cavities, which may overlap spatially and which provide for moderately to strong reflection lines as a result of the feature spacings being designed to provide constructive (in phase) reflections from a series of identical or similar features or cavities.

These and other objects of the invention will become apparent as a detailed description of representative embodiments proceeds.

SUMMARY OF THE INVENTION

In accordance with the foregoing principles and objects of the invention, high total transmission, tunable comb filter structures are described which comprise moderately thick layers of optical material having periodic or multiply periodic refractive index modulation comprising a multiplicity of coherently coupled, weakly-resonant optical cavities, resulting in and characterized by spectra of high order (5 or higher) relative to a fundamental (lowest order) cavity resonance, consisting of narrow, moderate to high density reflection lines occurring in one or more sets, each set being characterized by lines equally spaced by wave number if optical dispersion is neglected. Filters can be designed to be tuned, electro-optically or mechanically, such that the peaks within a spectral band of interest shift by one harmonic order and/or from one peak position to the next. Thus a filter may be tuned to reflect or transmit light of any specific wavelength within a band. The individual features defining optical cavities may be thin compared to a wavelength of interest as, for example, when metal films are used as part of a singly periodic comb filter, or may consist of a section whose thickness is equal to several wavelengths, but which is short compared to a cavity length.

DESCRIPTION OF THE DRAWINGS

The invention will be more clearly understood from the following detailed description of representative embodiments thereof read in conjunction with the accompanying drawings wherein.

DETAILED DESCRIPTION

Figure 1:
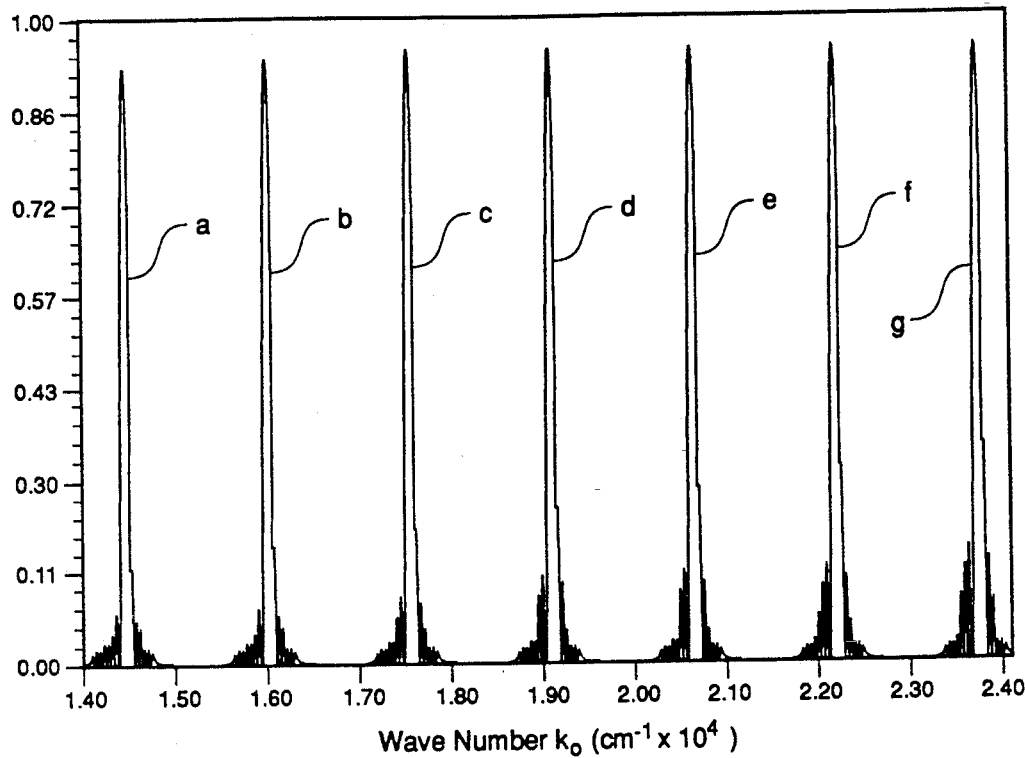
FIG. 1 shows reflection versus wave number for a representative comb filter of the invention showing reflection lines equally spaced as a function of wave number.
Figure 2:
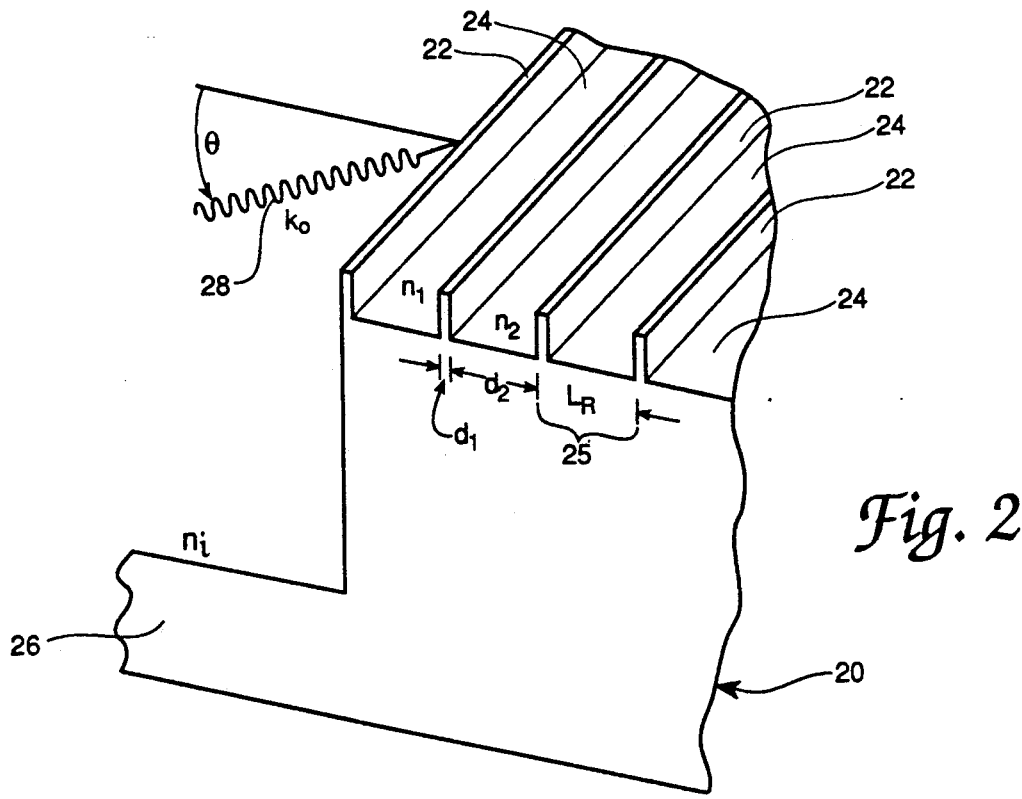
FIG. 2 illustrates schematically a singly periodic stepwise modulated comb filter of the invention providing narrow reflection lines and high total transmission.
Figure 3:
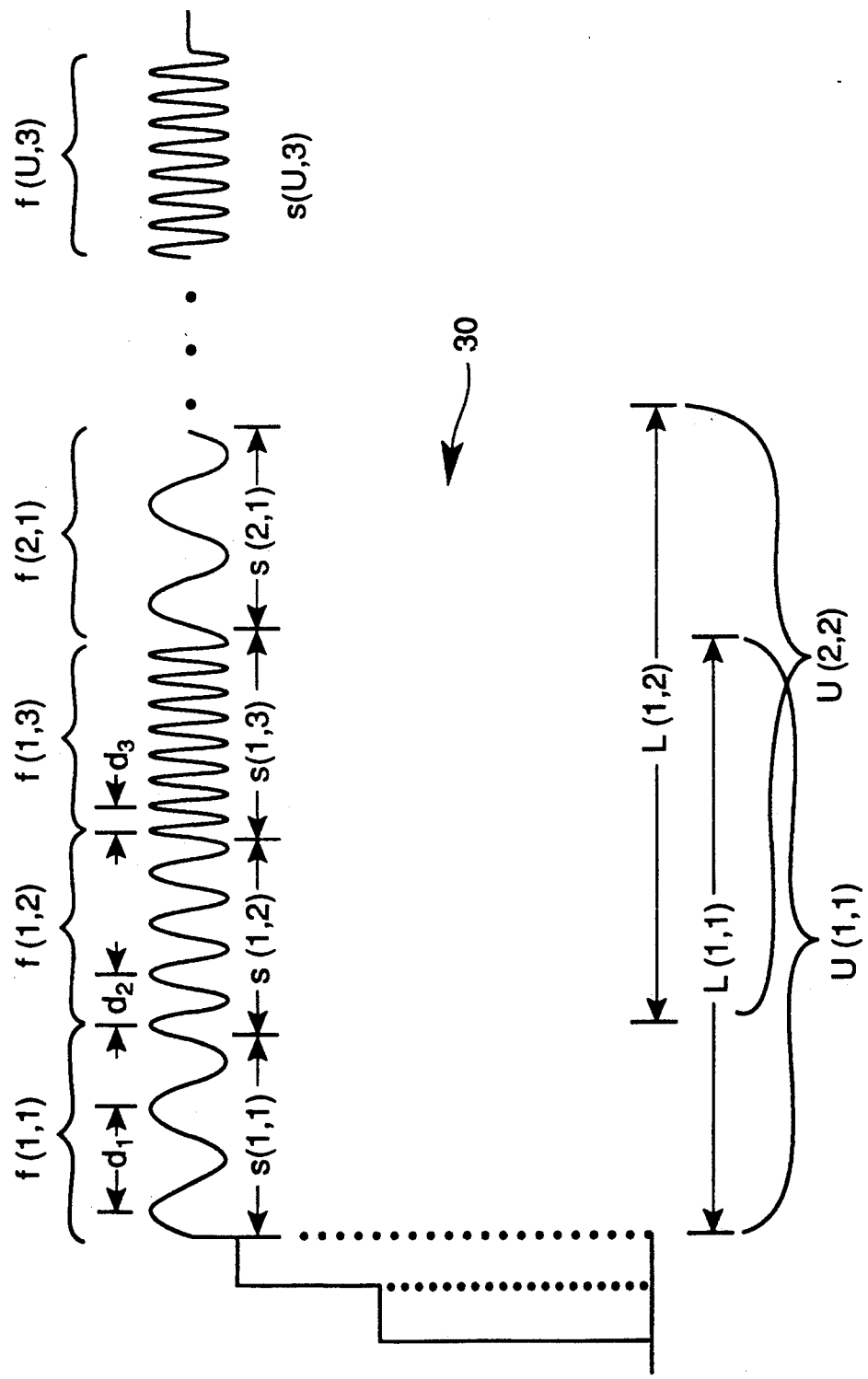
FIG. 3 illustrates schematically a multiple cavity comb filter of the invention which may be multiply periodic.

Referring now to the drawings, FIG. 1 shows reflection versus wave number for a representative comb filter of the invention showing lines a-g equally spaced as a function of wave number. FIGS. 2 and 3 illustrate two embodiments of the filter structure according to the teaching of the invention, viz., asymmetric simple periodic and multiply periodic cavity filters. In FIG. 2, use of higher harmonic resonances of a singly periodic modulation of the refractive index of a transparent medium, wherein the index modulation period comprises a series of long and short sections, which enhance the magnitude of the high harmonics in comparison to equal length sections, yields a high total transmission comb filter that may have high optical density reflection lines whose amplitudes tend toward a constant value, i.e., a spectrum generally similar to that of FIG. 1. Each period of this structure may be considered to be an optical cavity capable of producing a series of weak resonances determined by the cavity length $L_R$. In FIG. 3, a series of optical cavities each comprise a series of short periodic subsections, wherein the modulation and cavity lengths are selected to provide interference conditions that result in desired filter properties including the position, spacing, width and amplitude of the reflection lines; in the simplest case, a series of short periodic sections are repeated exactly to form weakly resonant optical cavities of equal length wherein each cavity may contain internal modulation which is fairly transparent to the stronger resonances of that specific type optical cavity.

Referring now specifically to FIG. 2, shown schematically therein is a singly periodic stepwise modulated comb filter 20 of the invention providing high total transmission. The value $n_i$ represents the refractive index of the substrate or another medium 26 adjacent to the filter 20 through which an incident light wave 28 of spatial frequency $k_o$ impinges at angle $\theta$. Filter 20 comprises layers 22 of thickness $d_1$, and 24 of thickness $d_2$, in regularly repeated layer pairs, represented in FIG. 2 by regions labeled for the different respective refractive indices $n_1$ and $n_2$ of the layers, and defining periodic subsections 25 of length $L_R$ each including a layer pair 22,24. The optical length of the cavity ($n_1d_1 + n_2d_2$) is in the case approximately equal to $n_2d_2 = n_2L_R$. The thinner of the layers 22 may have a thickness $d_1$ of the order of a wavelength in the range of interest if the material is a dielectric but may need be much thinner if the material is a metallic film in order for the film to be moderately transparent. In accordance with a principal teaching of the invention, the length $n_2d_2$ is equal to or greater than 5 times longer than $a_1d_1$ in order to enhance the higher order harmonics of cavity 25.

Layers 22 may comprise a thin layer of any conducting material such as silver, gold, aluminum or indium tin oxide where the layer thickness permits no more than about 70% reflection and no more than about 5% absorption of wavelengths of interest or any transparent dielectric material such as $SiO_2$, $TiO_2$, germanium, silicon or $BaTiO_3$ where the thickness is of the order of a wavelength of interest. Layers 24 may comprise any transparent dielectric material of different index than layer 22 including, for example, those just mentioned and $LiNbO_3$, $ZnO$, 2-methyl-4-nitroaniline (MNA), liquid crystal composite (LCC, liquid crystal droplets in a polymer matrix), or elastic material such as polystyrene/collodion, applied to or deposited upon a suitable substrate or otherwise sandwiched between supporting layers as necessary to provide structural support to the filter. The fabrication technique selected for depositing filter layers in any disclosed embodiment of the invention depends on the wavelength range for which the filter is intended and nature of the materials used. From X-ray wavelengths to the mid-infrared, vacuum deposition techniques such as MBE, MOCVD, thermal evaporation, laser pulse and particle sputtering, spin coating or combinations thereof may be used. For mid-infrared and beyond, solid wafers of optical material may be polished or otherwise formed to consistent thickness and coated, joined or otherwise combined with another material to produce the desired layered configuration. If it is required to provide that the resulting filter be directly electro-optically tunable, the thicker layers 24 must be electro-optically active. Tuning of filters that do not include electro-optical materials may be accomplished be mechanical deformation of the structure or by angle tuning (tilting).

Layers 22,24 may be individually homogeneous, with each having a characteristic uniform of refraction, $n_1$, $n_2$, respectively, or the respective refractive indices may be internally modulated as required in order to tailor the comb peak amplitude envelope in the spectral range of interest.

The spectral characteristics of filter 20 shown in FIG. 2 change if the filter, shown as regions of refractive index $n_1,n_2$, is permitted to evolve from having equal lengths to highly unequal lengths. If the total length of a period 25 remains constant while the length of one of the two segments (layer 22) tends toward zero from a condition of equal optical lengths ($n_1d_1=n_2d_2$), the spectral characteristics of filter 20 changes from one having a single dominant fundamental resonant frequency and subdued harmonics, to a well-defined uniformly spaced series of resonant frequencies having nearly equal strength in the spectral range of interest, provided that the individual layers 22 and 24 are not internally modulated. Thus the result of a moderate to small amplitude index modulation and several to a large number of periods of modulation may be a uniform amplitude comb filer or with selected modulation of the shorter layer 22, on the scale of a half-wavelength in the wavelength range of interest, the envelope of the reflection line peak amplitudes may be caused to peak in the range of interest.

The position and spacing (free spectral range, FSR) of the comb peaks of a cavity filter such as those shown in FIGS. 2 and 3 in terms of wavelength, wave vector and frequency, respectively, are given by, $$m\lambda_m = 2n_aL_R \cos\theta$$

$$k_m = 2\pi/\lambda_m = m\pi/n_aL_R \cos\theta$$

$$k_m - k_{m-1} = \pi/n_aL_R \cos\theta$$

$$F_m - F_{m-1} = c/2n_aL_R \cos\theta,$$

where m is an integer, and $\lambda_m$, $k_m$ and $F_m$ are the respective wavelength, wave vector and frequency of the mth harmonic referenced to vacuum, $n_a$ is the average refractive index (which usually increases with decreasing wavelength in transparent dielectric materials), $L_R = d_1 + d_2$ is the length of one period (one cavity), $\theta$ is the angle of incidence of a light ray to the filter normal, and c is the velocity of light. The magnitude of harmonics of the fundamental increases as the shape to the periodic modulation departs from that which can be fitted by a simple sinusoidal wave form. In the extreme case, $L_R \cong d_2$ in FIG. 2, the index modulation consists of a series of sharp peaks (delta functions) which results in a reflection spectrum (e.g. FIG 1) comprising a series of sharp lines.

By selecting $L_R$ and the filter material and/or by manipulating the refractive index by alloying materials one can cause comb peaks of the order of 100 or less to fall near (within about 0.2% to 0.3% of) the wavelength of several selected laser lines in the visible and near infrared. For example, by using the wavelength dependent ordinary index $n_o$ of $LiNbO_3$, a polarization independent electro-optically tunable filter for angles near $\theta = 0$ results, where the difference between 7 major laser lines and comb lines is less than 0.3% when the free spectral range is of the order of 1% and more of the comb line wavelengths. Such an arrangement may be beneficial by shortening the tuning response time of a filter. Thus the tuning voltage and tuning angle may be reduced from a set value, but the maximum voltage or off normal angle to be applied to reach any of a set of lines may not be substantially reduced unless the nearest comb lines occur to one side of the selected lines. (The comb lines shift unidirectionally with electric field or angle.)

Figure 4A:
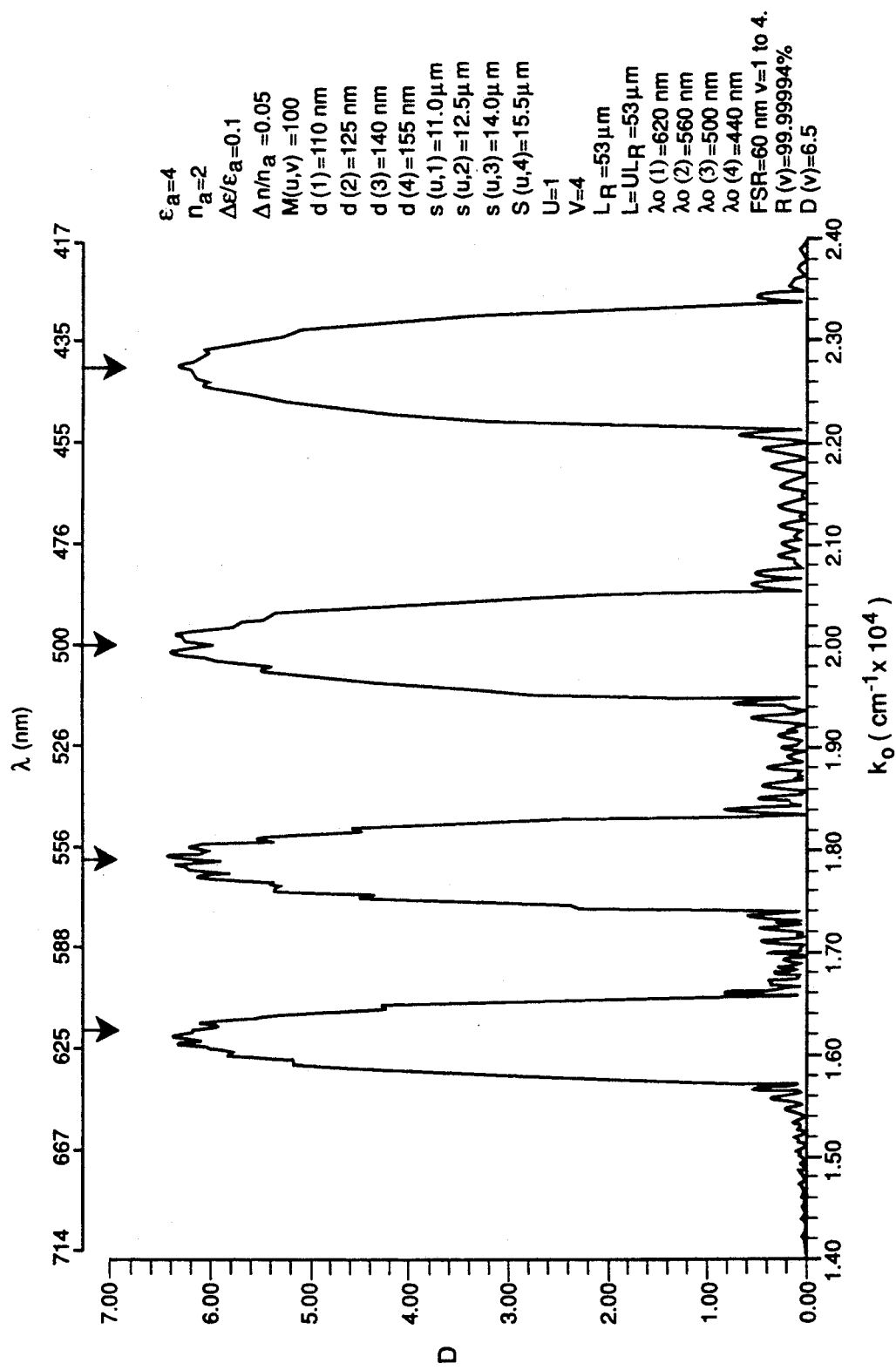
FIG. 4a shows a typical design for a comb filter constructed from a dielectric where four simple harmonic index modulations are arranged in series.
Figure 4B:
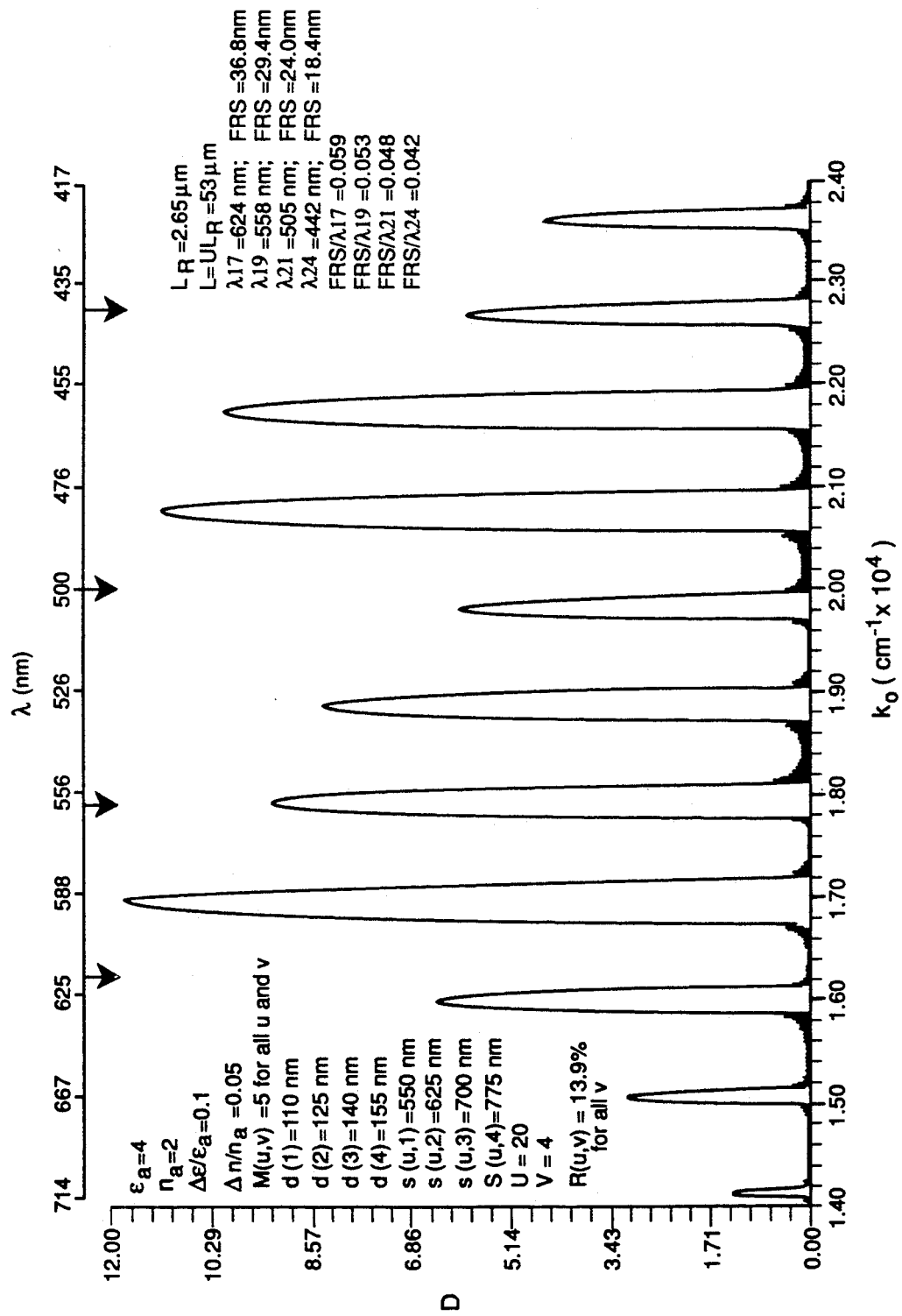
FIG. 4b shows the effect on the reflection spectrum of dividing the modulation into shorter segments s(u,v) so that the structure forms multiple cavities of length $L_R$.
Figure 5A:
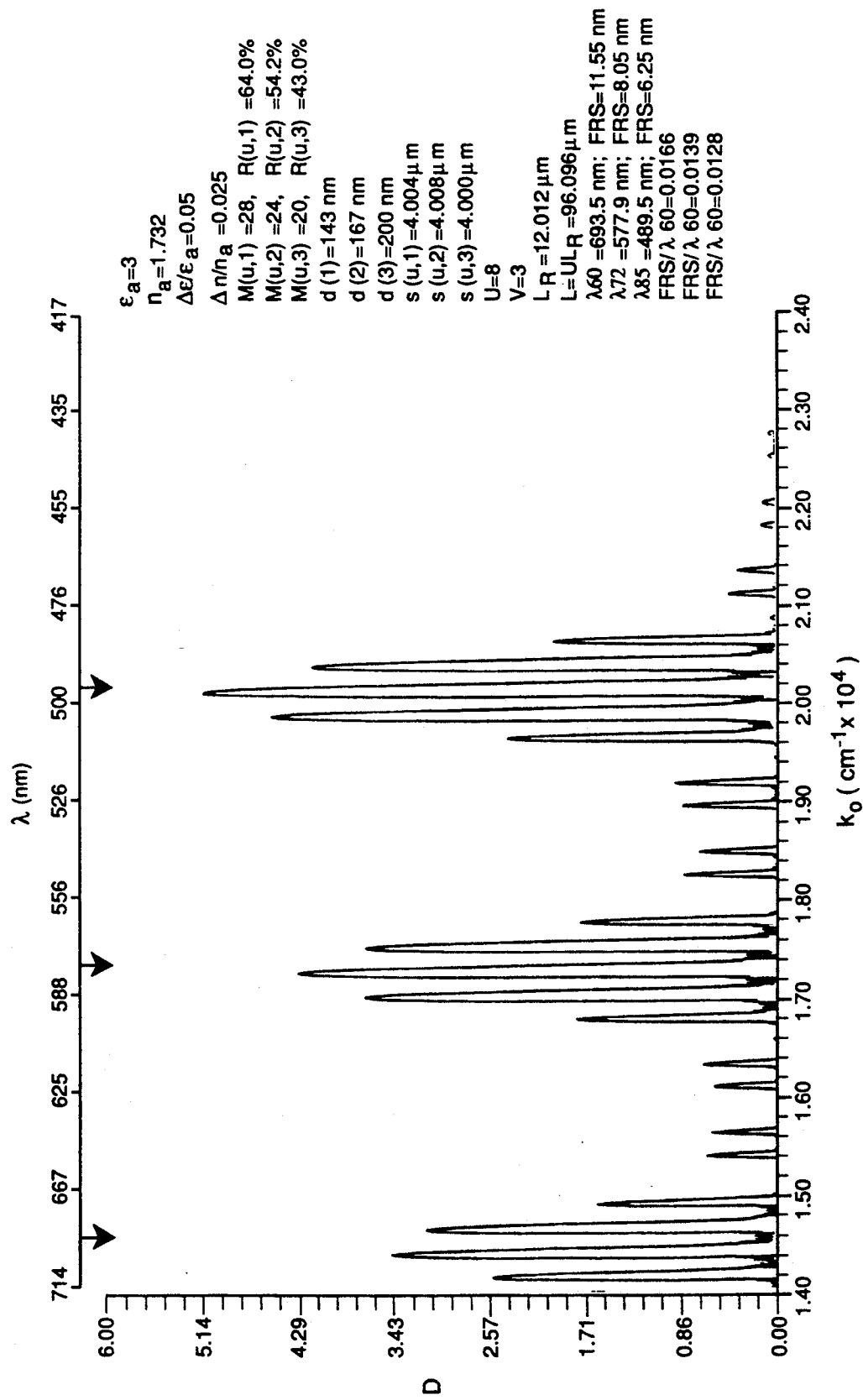
FIGS. 5a and 5b shows examples where the d(v) and $L_R$ are chosen to place comb lines near selected laser lines and to enhance the amplitudes of comb lines near the laser lines.
Figure 5B:
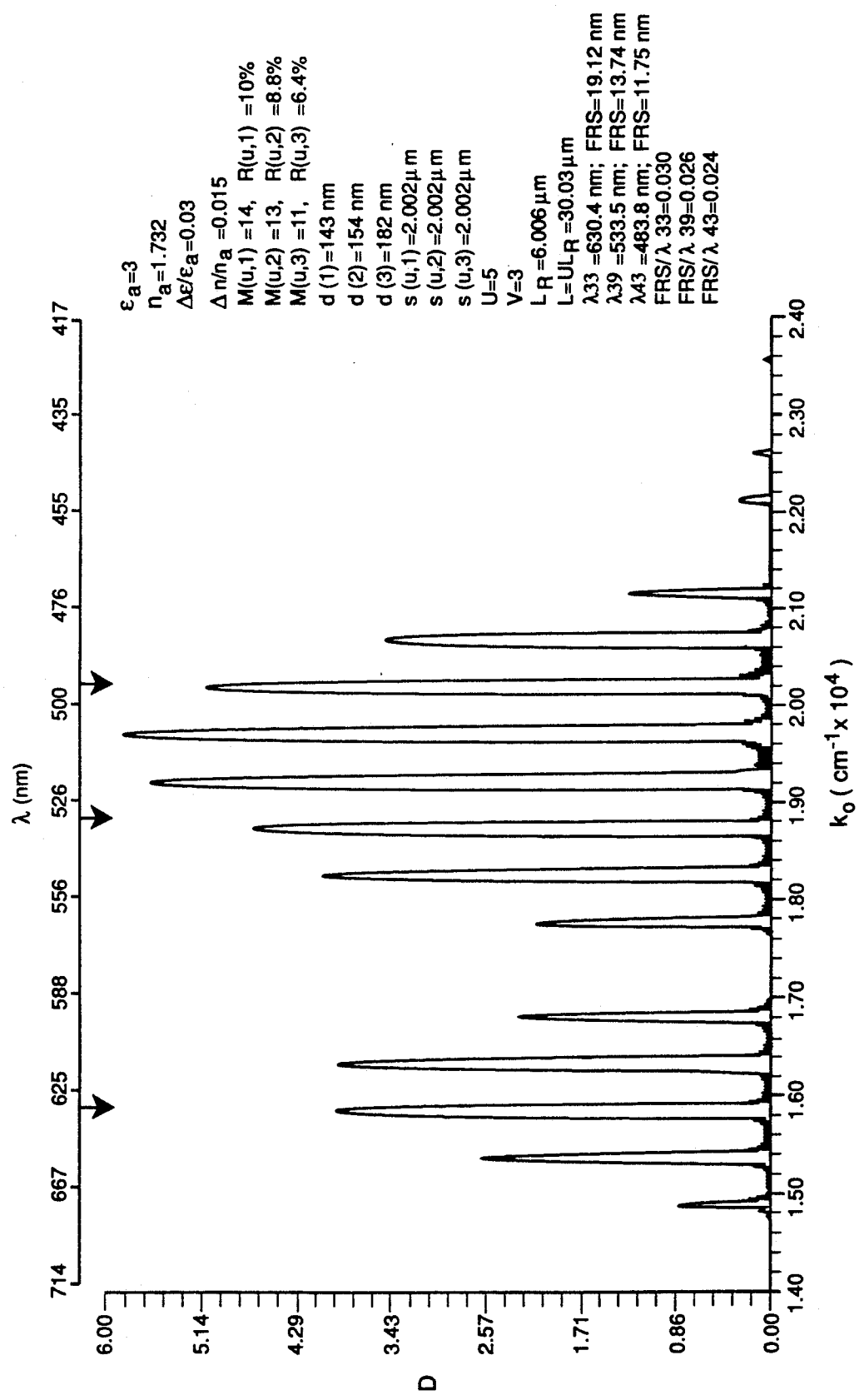

FIGS. 4b and 5a and 5b show examples where $L_R$ is selected, with $n_a$ independent of wavelength, to cause comb peaks to fall near selected spectral lines and to be enhanced in magnitude near those lines. In FIG. 5a the envelopes associated with the d(v) show little effect of overlap and the strongest comb lines are adjacent to the selected line, while in FIGS. 4b and 5b the envelopes associated with the d(v) overlap causing comb peaks between the selected lines to be stronger than those adjacent to the selected lines. Note that the comb lines of FIG. 4b nearest the selected lines have the same optical density as the corresponding lines in the series Bragg filter of FIG. 4a.

Comb line broadening will occur in filters structured according to the invention because of imperfect modulation. Some broadening may be desirable in cases such as for a comb line to reflect a less restrictive range of wavelengths or a less restrictive range of angles at a given wavelength. This situation is similar to the case of multiple F-P type cavities where cavity spacing is purposely varied from a common value to broaden a comb peak while providing a sharp cutoff in transmission, (Dobrowolski, and van de Stadt et al). Also, as in the case of multiple F-P type cavities, cavities with slightly different $L_R$ values may be produced in order to intentionally broaden comb peaks by forming overlapping comb sets in the spectral band of interest.

Referring now to FIG. 3, illustrated schematically therein is a multiple cavity, multiply periodic comb filter 30 of the invention. Filter 30 can be best described as having a plurality of internally modulated features associated with the parameter v, where the modulation is designed to provide a desired structure for the amplitude envelope of the comb peaks. In some of the simpler cases, the optical cavities $C(u,v)$, which in general have individual lengths $L(u,v)$, are all of equal length $L_R$ producing a single set of reflecting comb lines, characterized by a peak spacing $k_n - k_{n-1} = \pi/n_a L_R \cos\theta$ where $n_a$ is the average index of the cavities (In this case the cavities differ only in the order of the elements $f(u,v)$.) and further characterized by comb peak amplitudes as determined by the specific modulation provided the filter elements $f(u,v)$ and the spacing between like elements, $L_R$. A general condition of the invention is that $L(u,v) = m(v)\lambda_m(v)/2n_a \cos\theta$ where $m(v)$ is an integer and $\lambda_m(v)$ is the corresponding wavelength, referenced to vacuum, and which if near $\lambda_o(v)$, where $\lambda_o(v)$ is the fundamental for the modulation unit of length $d(v)$, will be strongly reflected by the filter elements associated with the parameter v; this condition ensures that the reflections from like filter elements will be in phase.

In FIG. 3 filter elements $f(u,v)$ are composed of sinusoidal modulation producing a reflectance $R(u,v)$ at a characteristic wavelength $\lambda_o(v)$, to be defined below, and like subfilter elements have equal number of periods $M(u,v) = M(v)$. This need not be the case in general but is likely to be the case in most applications. In general each cavity of length $L(u,v)$ of filter 30 comprises a series of subfilter elements $f(u,v)$ which in turn comprise a small integer number $M(u,v)$ of whole modulation periods of length $d(v)$. (These periods may have any form of modulation but are most likely to be stepwise or sinusoidally modulated.) Each subfilter element $f(u,v)$ has a length $s(u,v)$ given by $$s(u,v) = M(u,v)d(v).$$

In special cases, as noted above, $s(u,v)$ may be independent of u. For normally incident light, the fundamental (denoted here by the subscript o) reflection line frequency $F_o$ and wavelength $\lambda_o$, $F_o(v) = c/\lambda_o(v)$, associated with the subfilter elements $f(u,v)$ for all values of u, of filter 30 are derived from, $$\lambda_o(v) = 2n_a d(v)\cos\theta,$$

where $n_a$ is the average refractive index within filter 30, $d(v) = d_v$ is the period of modulation of a filter element, $\theta$ is the angle of incidence relative to the normal to filter 30 and c and $\lambda_o$ are the wave velocity and wavelength, respectively, in vacuum. The filter elements $f(u,v)$ are repeated two or more times, and in order that like filter elements contribute most effectively in reflecting $\lambda_o(v)$ and its harmonics, it is required that the phase spacing between similar elements be a multiple of $\pi$, or equivalently that the physical spacing $L(u,v)$ between similar elements be $$L(u,v) = m(u,v)\lambda_o(v)/2n_a$$

where $m(u,v)$ is an integer and $n_a$ is the average index, appropriate to the wavelength, within the cavity corresponding to the length $L(u,v)$ as indicated in FIG. 3. Such a compound filter may consist of a series of filter elements:

f(1,1),f(1,2) ... f(1,v) ... f(1,V),f(2,1),f(2,2) ... f(2,v)
... f(2,V) ... f(u,1) ... f(U,V).

where the $f(u,v)$, $v=1$ to V, represent short sinusoidal or otherwise simply modulated filter elements of length $s(u,v) = m(u,v)d(v)$ consisting of periods of length $d(v)$ situated in series. This is illustrated with $V=3$ in FIG. 3. The filter elements having a common v, e.g. $v=1$, may be identical or may have a common subperiod of length $d(v)$ but a different length $s(u,v)$ and number of cycles $M(u,v)$. In general, the cavities are taken as the space between the origins, and the ends of the like filter elements $f(u,v)$ and $f(u+1,v)$, which have a common $d(v)$, so that the lengths of these cavities $L(u,v)$ are given by the following sequence of sums:

$L(1,1) = \text{Sum } s(1, v = 1 \text{ to } V)$
$L(1,2) = \text{Sum } s(1, v = 2 \text{ to } V) + \text{Sum}(2, v = 1)$
$L(1,3) = \text{Sum } s(1, v = 3 \text{ to } V) + \text{Sum}(2, v = 1 \text{ to } 2)$
───
$L(U,V) = \text{Sum } s(U, v = 1 \text{ to } V).$ In the special case where $s(u,v)$ is independent of u, $s(u,v) = s(v)$, a multiply periodic structure results having a major period of length $L(u,v) = L_R$ providing a single set of comb peaks. More generally, if a series of cavities formed from subfilter sets is to act cooperatively to enhance the reflection amplitude of a set of chosen wave-lengths and require a minimum amount of tuning from a set situation, one may select wavelength approximately and determine by iterating which periods $d(v)$ and wavelengths $\lambda_o(v) = 2n_a d(v)$ near the desired wavelengths satisfy the condition that all cavities of length:

$$L(u,v) = m(u,v)d(v) = m(u,v)\lambda_o(v)/2n_a(\lambda_o(v)), v=1 \text{ to } V \quad (2)$$

where the $m(u,v)$ are integers. In Eq (2) the fact that $n_a$ is a function of $\lambda_o$ is explicitly indicated.

A special case of interest is where all subfilter elements $s(u,v)$ are equal in length or have lengths divisible by a common length, but contain different lengths $d(v)$. In this case the filter comb sets have some common harmonic frequencies and the fundamental of one set may be a harmonic of another. If the product $m(u,v)d(v)$ is the same for all u and v, the filter will produce one set of comb lines associated with the length $L_R = m(u,v)d(v)$ as is the case for the filters of FIGS. 4b and 5a and 5b.

The condition imposed by Eq (2) and the requirement that reflections $R(u,v)$ from individual subfilter elements $f(u,v)$ be moderate to small, (less than 70%) results in a filter with Eq (1). A set of comb lines will generally result for each distinct cavity length. The relative amplitudes and half-widths of the reflection lines are determined by the lengths of $s(u,v) = M(u,v)d(v)$, and the magnitude of the modulation $\epsilon(u,v,z) = n^2(u,v,z)$ along the normal direction z of the subperiod elements $d(v)$, and the number of cavities U of each type that contribute to the amplitude of a comb peak. When Eq (2) is satisfied, connecting the comb peaks may yield an envelope with a maximum occurring at or near a characteristic frequency, wave number, or wavelength (fundamental or harmonic) of each subfilter element d(v), v=1,V, or between when the envelope structure associated with individual subfilter elements d(v) overlap (FIGS. 4b, 5a, 5b). The half-width of an envelope when uniquely associated with a series of elements containing periods of length d(v), depends ideally on the total number and modulation depth of these periods.

In the event that a filter of the invention comprises layers having refractive index which is modulated, and if the modulation depths $\Delta\epsilon(z)$ of the dielectric constant are small compared to the average value of the dielectric constant $\epsilon_a = n_a^2$, then the resulting reflection spectrum will approximate the Fourier transform of the dielectric profile $\epsilon(z)$ where z is the normalized physical position in the filter. To achieve a given spectrum, the dielectric profile is made as close as possible to this Fourier transform. In the simplest case, FIGS. 1 and 2, the Fourier transform of a comb spectrum is a comb profile.

A series of filter elements f(u,v), u=1 to U and v=1 to V, according to the invention include U not less than 2, no elements f(u,v) having a reflection greater than 70% and further meeting the conditions of Eq (2) whereby the filters act cooperatively in reflection to provide relatively narrow reflection lines separated by relatively broader ranges of transmission. Taken in a more general form such a series can be reduced to numerous special cavity filter cases found in the literature, which include a few f(u,v) at least two of which produce a large reflectance (greater than 70%) and by the condition causing destructive interaction between selected reflections, that is $$L(u,v) = [m(u,v) + \tfrac{1}{2}]\lambda(v)/2n_a,$$

which yields narrow transmission lines separated by relatively broad regions of reflection. By letting U=1 the series f(u,v) may also represent an adjacent series of Bragg structures which may be sinusoidally modulated as in FIG. 4a or stepwise modulated, or a superimposed set of simple modulations referred to earlier as parallel modulation, both of which result in relatively broad reflection lines compared to the invention and which do not form cavities in the usual sense.

The foregoing discussion has considered only filters comprising the described periodic or multiply periodic layered structure. Ordinarily, however, the layered structure is sandwiched between thick supporting layers, which may add significant undesired interference effects. These interferences are characterized by harmonic resonances conforming to Eq (1) with $L_R$ replaced by L, the length of the total filter structure, and are affected by the magnitude and abruptness of the transition from the average filter index to that of the substrate of other bounding medium. The resulting interference effects may be minimized by grading the index or adding an intermediate index layer to minimize undesired reflections.

Filters constructed according to the teachings of the invention may be made electro-optically tunable by constructing from layers comprising an electro-optically active material to which a suitable electric field may be imposed, the parameters of which depend upon filter layer material selection, and the degree to which peaks in the interference spectrum of the filter need be shifted. The degree of tuning is proportional to the change in the index $n_a(\lambda_m)$ induced by the applied voltage. TABLE 1 provides examples of the material parameters and tuning conditions for two uniaxial optical crystalline materials and one isotropic liquid crystal composite which might be used to make a tunable filter that is polarization independent for normally incident light by requiring that the optic axis of the film be normal to the film. These specific examples show the field and voltage required to shift a line at 633 nm by one present. That is, $\Delta\lambda_m/\lambda_m = \Delta n_o/n_o = 0.01$. (Here $n_o$ is equivalent of $n_a$ in the general development and is used to denote the ordinary index of the uniaxial material.) The filter thickness and distance between electrodes is assumed to be 100 microns which might include 5 to 20 typical cavities of the invention. The appropriate linear electro-optic (Pockels) formula. $\Delta n_o = -n_o^3 r_{13} E/2$ and quadratic electro-optical (Kerr) formula, $(n_e - n_o) = -K\lambda E^2$ and data are from Yariv et al, supra, and from Sansone et al. ("Large Kerr effects in transparent encapsulated liquid crystals", J. Appl. Phys. 67, No. 9 4253 (1990)). Also used is the relation that $n - n_o = (n_e - n_o)/3$ where n is the index for the unpoled encapsulated isotropic liquid crystal material. The K value for the encapsulated liquid crystal composite (LCC) material is assumed to be 5000 times that of $CS_2$, which corresponds to a suitably transparent (nonscattering) material. The symbols used here are $n_o$ the ordinary refractive index where the material is uniaxial or becomes uniaxial under the applied external field, $E = -V_a/L$, where $V_a$ is the applied voltage and L is the total length of the filter and also the distance between electrodes; $r_{13}$ is a linear electro-optic coefficient, and K is the quadratic electro-optic coefficient for an isotropic Kerr material with index n at the wavelength $\lambda = 633$ nm. Here $n_o$ and n correspond to $n_a$, the average index for the modulated structure used in earlier discussion. The point of Table I is to show that direct tuning of electro-optic materials with high voltages provides only small shifts in comb filter lines, so that comb lines need to be narrow and closely spaced or positioned close to laser source lines in order to tune electro-optically to and reflect the line. Even if voltage were made higher than indicated in TABLE I, one may find that the electro-optic effect saturates as in an example case of the LCC where $n_e - n_o$ saturates at 0.055 (see Sansone et al).

TABLE 1

| Material | $n_0$ | $r_{13}$ (pm/v) | E (Mv/cm) | Va (kv) |
|---|---|---|---|---|
| LiNbO3 | 2.286 | 9.6 | 3.98 | 39.8 |
| Ba.25Sr.75Nb2O6 | 2.3117 | 67 | 0.594 | 5.94 |
|  | n | K (pm/v$^2$) |  |  |
| LCC | 1.597 | 159 | 0.173 | 1.73 |

A filter of the invention may also be tuned electro-optically by using an elastically deformable material and a means of applying pressure such as a piezoelectric crystal. Still another method which permits larger shifts in comb peaks is angle tuning. The relative change can be determined by simply noting from Eq (1) that $(\lambda_2 - \lambda_1)/\lambda_1 = (\cos\theta_2 - \cos\theta_1)/\cos\theta_1$; the shift $d\lambda/d\theta$ goes as $\sin\theta$ so is smallest near $\theta = 0$.

The invention therefore provides an improved tunable comb type optical interference filter. It is understood that modifications to the invention may be made as might occur to one skilled in the field of the invention within the scope of the appended claims. All embodiments contemplates hereunder which achieve the objects of the invention have therefore not been shown in complete detail. Other embodiments may be developed without departing from the spirit of the invention or from the scope of the appended claims.

We claim:

1. A comb type optical interference filter comprising:
   (a) a first plurality of layers f(u,v), u=1 to U, v=1 to V defining a second plurality of individual optical cavities C(u,v) of length L(u,v), u=1 to U, v=1 to V, where U and V are preselected integers and U not less than 2, each said optical cavity comprising a third plurality of subfilter elements f(u,v) each having a reflectance at most equal to 70% of respective lengths s(u,v), represented by the series:

f(1,1),f(1,2) ... f(1,v) ... f(1,V),f(2,1),f(2,2) ... f(2,v) ... f(2,V) ... f(u,1) ... f(U,V), wherein s(u,v) is an integer multiple of a preselected length d(v) defining a recurring refractive index modulation of said subfilter elements; and wherein said subfilter elements comprise a series of overlapping optical cavities C(u,v) of length L(u,v), each respective said optical cavity length being substantially equal to the inverse average refractive index thereof times an integer m number of preselected half wavelengths to be reflected by said filter, $L(u,v) = m\lambda_m(u,v)/2n_a(u,v)$, and where m is at least 5, and, wherein the lengths $s(u,v) = M(u,v)d(v)$ and the amplitude of the modulation of the refractive index of the filter elements f(u,v) contained by the cavities C(u,v) are preselected to provide a preselected amplitude modulation of the reflectance of said wavelengths to be reflected by the combined coherent interference of the said cavities.

2. The filter of claim 1 wherein said filter elements f(u,v) comprise a dielectric.

3. The filter of claim 2 wherein said dielectric is selected from a group consisting of $TiO_2$, germanium, silicon, $BaTiO_3$, $LiNbO_3$, $Ba_{.25}Sr_{.75}Nb_2O_6$, ZnO, 2-methyl-4-nitroaniline, liquid crystal composite, polystyrine/collodion, and polystyrene/polyvinyl alcohol.

4. The filter of claim 1 wherein the filter elements f(u,v) comprise an electro-optic material.

5. The filter of claim 1 wherein the filter elements f(u,v) comprise an elastically deformable material.

6. The filter of claim 1 wherein at least one of the L(u,v) is an integer multiple of another L(u,v).

7. The filter of claim 1 wherein all L(u,v) are equal.

8. The filter of claim 1 wherein s(u,v) equals s(v) for all values of u.

9. The filter of claim 1 wherein all s(u,v) are integer multiples of a common length.

10. The filter of claim 9 wherein all s(u,v) are equal.

* * * * *

UNITED STATES PATENT AND TRADEMARK OFFICE
CERTIFICATE OF CORRECTION

PATENT NO.   :   5,225,930
DATED        :   July 6, 1993
INVENTOR(S)  :   Peter L. Land et al It is certified that error appears in the above-identified patent and that said Letters Patent is hereby corrected as shown below:

Abstract, line 12, "inversion" should be -- invention --.
Column 1, line 50, "then" should be -- than --.
Column 2, line 29, "resonant" should be -- resonate --.
Column 2, line 52, "is" should be -- in --.
Column 3, lines 17-18, "generate" should be -- generates --.
Column 4, line 21, "van de Stat" should be -- van de Stadt --.
Column 6, line 63, "the" should be -- this --.
Column 7, line 36, "be" should be -- by --.
Column 7, line 39, -- index -- should follow "uniform".
Column 7, line 51, "characteristics" should be -- characteristic --.
Column 7, line 60, "filer" should be -- filter --.
Column 8, line 7, "cos θ" should be -- sin θ --.
Column 8, line 7, -- (1) -- should appear at the right margin.
Column 9, line 61, "x" should be -- π --.
Column 10, line 56, -- moderate to quite narrow reflection lines spaced in accordance with -- should follow "with".
Column 12, line 39, "voltage" should be -- voltages --.
Column 13, line 1, "contemplates" should be -- contemplated --.
Column 13, line 17, the second occurrence of "f(1,v)" should be -- f(1,V) --.
Column 14, line 26, claim 9, "1" should be --8--.

Signed and Sealed this

Third Day of May, 1994

Attest:

BRUCE LEHMAN

*Attesting Officer*   *Commissioner of Patents and Trademarks*